United States Patent
Minari

(10) Patent No.: US 6,809,831 B1
(45) Date of Patent: Oct. 26, 2004

(54) PRINT CONTROLLER, PRINT SYSTEM, PRINT CONTROLLING METHOD, AND RECORD MEDIUM

(75) Inventor: Makoto Minari, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,521

(22) Filed: May 10, 1999

(30) Foreign Application Priority Data

May 12, 1998 (JP) ............................... 10-145200
Apr. 13, 1999 (JP) ............................... 11-105325

(51) Int. Cl.[7] .............................................. G06F 15/00
(52) U.S. Cl. .................... 358/1.15; 358/1.16; 358/1.14; 358/296
(58) Field of Search ................ 358/1.15, 1.14, 358/1.13, 1.1, 404, 296, 444, 1.16, 1.9

(56) References Cited

U.S. PATENT DOCUMENTS

| | | | | |
|---|---|---|---|---|
| 5,617,518 A | * | 4/1997 | Kuwamoto et al. | ........ 358/1.15 |
| 5,625,757 A | * | 4/1997 | Kageyama et al. | ........ 358/1.14 |
| 5,748,861 A | | 5/1998 | Kashiwazaki et al. | ...... 395/110 |
| 6,335,795 B1 | * | 1/2002 | Neuhard et al. | ........... 358/1.15 |

* cited by examiner

*Primary Examiner*—Twyler Lamb
(74) *Attorney, Agent, or Firm*—Fitzpatrick, Cella, Harper & Scinto

(57) ABSTRACT

In a print control system in which an information processor is connected to a plurality of printers, a print job that includes a plurality of instructions and print data associated with the plurality of instructions are received from a network. The received print data is stored, and the stored print data is read in accordance with the plurality of instructions. A printing device is controlled to output an image based on the read print data, in accordance with the plurality of instructions.

44 Claims, 16 Drawing Sheets

FIG. 3

SET PRINT JOB

JOB NAME: [JOB I] ~300

PRINTER: [PRINTER I | http://printer1.xyz.co.jp ◀ ▶] ~301

DOCUMENT NAME: [DOCUMENT A] ~302

PRIORITY: ◯ HIGH ■ AVERAGE ◯ LOW ~303

PAGES TO PRINT: ■ ALL ◯ FROM~TO [ ~ ] ~304

COPIES: [1] ~305
■ USED IF SET PRINTER FAILS IN PRINTING

SUBSTITUTE PRINTER: ■ USED IF SET PRINTER IS INADEQUATE FOR SET PRINT JOB ~306

FIG. 13

| PRINT JOB ATTRIBUTE | JOB NAME | HOST | PRINTER | REQUEST | DOCUMENT | PAPER SIZE | COLOR/MONO | PRIORITY | PAGES | COPIES | PAGES PRINTED | COPIES PRINTED | RESULT |
|---|---|---|---|---|---|---|---|---|---|---|---|---|---|
| (1) | JOB I | HOST I | PRINTER I | PRINT | DOCUMENT A | A4 | MONO | AVERAGE | 1 TO 20 | 1 | 0 | 0 | UNEXECUTED |
| (2) | JOB I | HOST I | PRINTER I | PRINT | DOCUMENT A | A4 | MONO | AVERAGE | 1 TO 20 | 1 | 20 | 1 | SUCCESSFUL |
| (3) | JOB I | HOST I | PRINTER I | PRINT | DOCUMENT A | A4 | MONO | AVERAGE | 11 TO 20 | 1 | 10 | 0.5 | NO PAPER SUBSTITUTE |
| | JOB II | HOST I | PRINTER II | PRINT | DOCUMENT A | A4 | MONO | AVERAGE | 1 TO 20 | 1 | 0 | 0 | UNEXECUTED |
| (4) | JOB I | HOST I | PRINTER I | PRINT | DOCUMENT A | A4 | MONO | AVERAGE | 1 TO 20 | 1 | 0 | 0 | NO SIZE SUBSTITUTE |
| | JOB II | HOST I | PRINTER II | PRINT | DOCUMENT B | A4 | MONO | AVERAGE | 1 TO 25 | 1 | 0 | 0 | UNEXECUTED |
| (5) | JOB I | HOST I | PRINTER I | PRINT | DOCUMENT B | A4 | MONO | AVERAGE | 1 TO 25 | 1 | 0 | 0 | UNEXECUTED |
| | JOB II | HOST I | PRINTER II | PRINT | DOCUMENT B | A4 | MONO | AVERAGE | 1 TO 25 | 1 | 0 | 0 | UNEXECUTED |

PRINT CONTROLLER, PRINT SYSTEM, PRINT CONTROLLING METHOD, AND RECORD MEDIUM

BACKGROUND OF THE INVENTION

1. Field of the Invention

The present invention relates to a print system in which an information processor is connected to a plurality of printers via a network, a print controlling method in the print system, an information processor and a print controller in the print system, and a record medium readable by a computer storing a print control program for the print system.

2. Related Background Art

With the progress of a network technique in recent years, a print processing system in which an information processor is connected to a plurality of printers via a network has been prevalent.

In this print processing system, a user can select an optimum printer for a practical print from the plurality of printers connected to the network, and then execute print processing. Thereby, the effective utilization of the printer can be accomplished.

On the other hand, when the printer processes various print jobs, various obstacles may occur. For example, record papers of an indicated paper size are not housed in a printer, or all of the record papers may be consumed during the processing of the print job and a paper-free state may take place. In addition, a print error such as a jam (a paper clogging) may occur during the processing of the print job.

Heretofore, in the case where such an obstacle of the printer occurs, the printer discontinues the processing of the print job, and notifies the user of the obstacle occurrence. The user himself notified of the obstacle comes to the installation position of the printer to eliminate the obstacle.

Accordingly, heretofore, in the case where the obstacle occurs in the printer, the print job cannot be restarted, so long as the user does not eliminate the obstacle. For this reason, firstly, there is a first problem that the user cannot promptly receive a printed matter. Secondly, there is a second problem that the information processor must halt works relating to the print job from the notification of the obstacle from the printer to the elimination of the obstacle. Thirdly, there is a problem that, in the case where it is difficult for the user to eliminate the obstacle of the printer, or in the case where a desired paper size cannot be set to the printer, the user must re-instruct the processing of the print job to another printer in the network.

SUMMARY OF THE INVENTION

For the purpose of solving the aforesaid problems, the present invention provides a print processing system capable of continuing the processing of a print job by a replaced printer even in the case where the processing of the print job is discontinued. Furthermore, the present invention provides a print processing method, an information processor and a printer in the print system. In addition, the present invention provides a record medium readable by a computer storing a print processing program for the print processing system.

According to the present invention, a user can obtain a desired printed matter readily and promptly.

BRIEF DESCRIPTION OF THE DRAWINGS

FIG. 3 is a view showing a set screen of a print job;

FIG. 13 is a diagram showing an example of a print job attribute;

DESCRIPTION OF THE PREFERRED EMBODIMENTS

Figure 1:
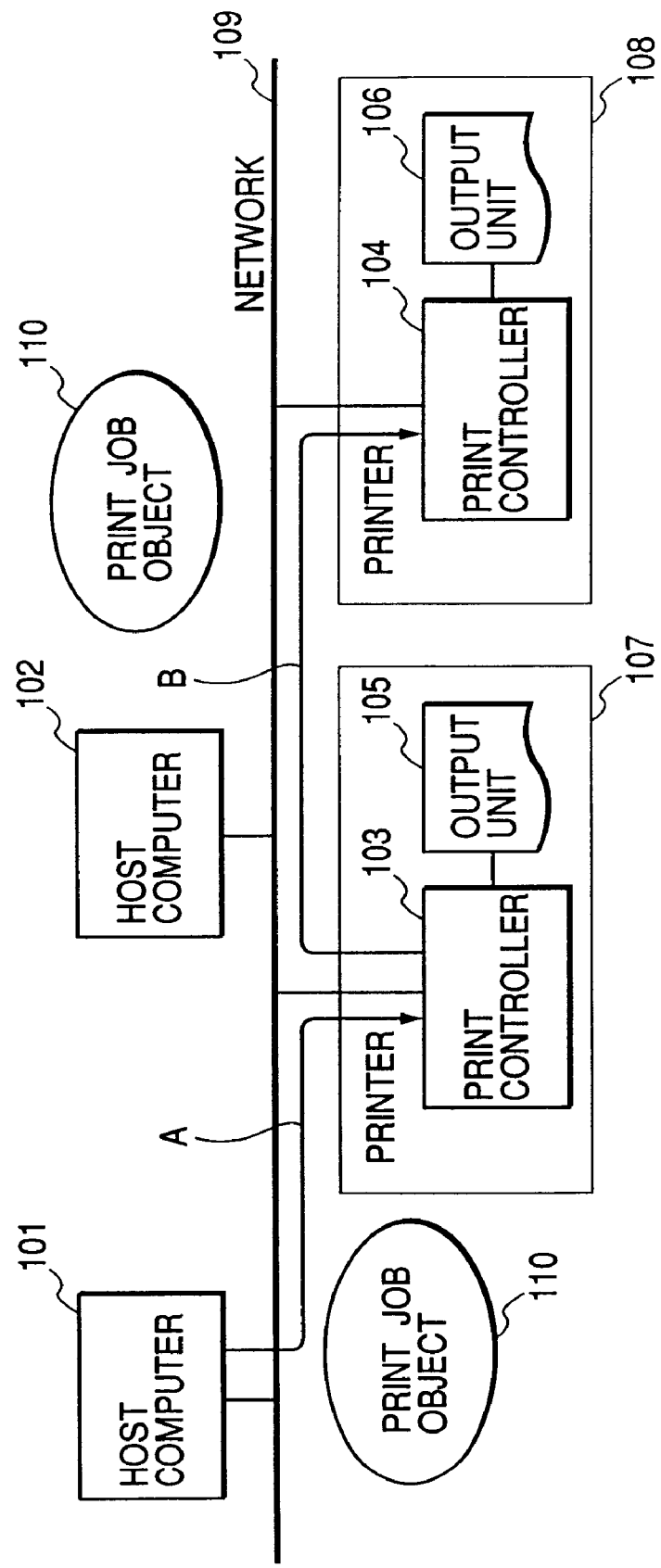
FIG. 1 is a system constitutional diagram showing a print processing system according to an embodiment of the present invention.

FIG. 1 is a system constitutional diagram showing a print processing system according to the present invention. In this print processing system, two host computers (a host computer 101 and a host computer 102) are connected to two printers (a printer 107 and a printer 108) via a network 109.

The printer 107 comprises a print controller 103 and an output unit 105. Similarly, the printer 108 comprises a print controller 104 and an output unit 106.

Incidentally, the network 109 is not limited to a local area network (LAN) or a wide area network (WAN). Further, the number of the host computers or the printers connected is not limited. Moreover, in an embodiment of the present invention, the connection between the host computer and the printer is performed basically by the network of a worldwide wave (WWW), but it can also be done by a network other than WWW.

In the network of WWW, it is presumed that a hypertext transfer protocol (HTTP) which is a standard protocol is used in communication between the host computer and the printer. Therefore, in the network of WWW, the identification of printers is carried out by a uniform resource locator (URL) address. The URL address is converted into an internet address by a service such as a domain name system (DNS). In the case where URL is not used, a name assigned to the printer is converted into an internet address by a service such as DNS.

A wave server is mounted on a communication portion of the printer so that the printer communicates with a host computer by HTTP. Incidentally, this communication portion controls interface operations between the device and the network 109. Further, a wave client is mounted on the communication portion of the host computer. Thus, the wave server and the wave client process a transfer of a print job object between the host computer and the printer. In this connection, the print job object will be explained below.

In FIG. 1, as shown by an arrow A, a print job object 110 is first transferred from the host computer 101 to the print controller 103 of the printer 107. Then, in the case where print processing based on the print job object is not suitable for the printer 107, or in the case where an obstacle occurs during the print processing, as shown by an arrow B, the print job object 110 is transferred from the printer 107 to the printer 108. Consequently, in the printer 108, the print processing based on the print job object 110 is continued.

Figure 2:
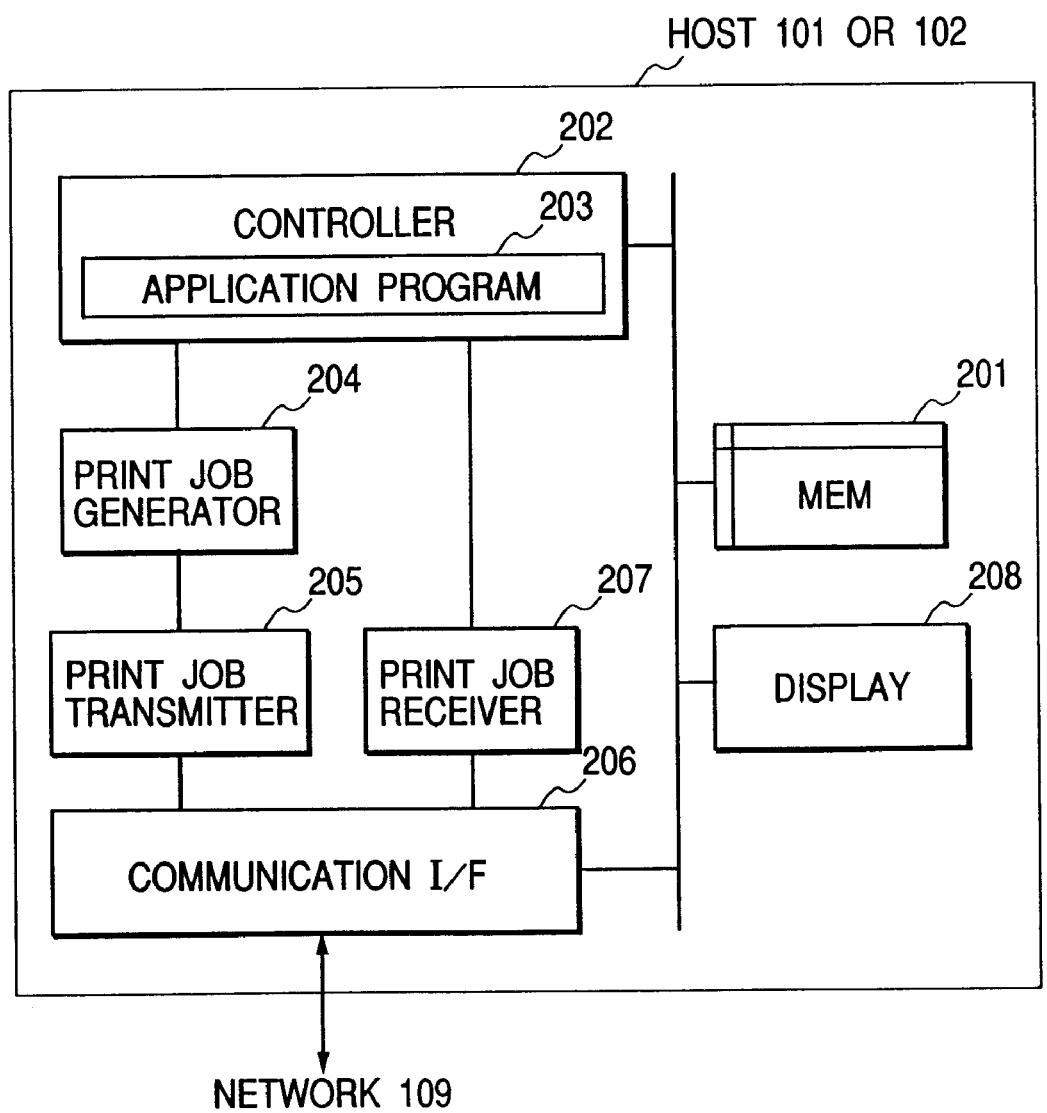
FIG. 2 is a functional block diagram of a host computer.

In the first place, the host computer will be described. FIG. 2 is a block diagram showing a functional configuration of the host computers 101, 102. In a memory 201, an operating system OS, a control program, a control data, an application program, etc. are stored. A controller 202 controls the undermentioned portions on the basis of programs, data, etc. stored in the memory 201. Incidentally, an application 203 utilized by a user is executed by the controller 202.

A print job generator 204 produces a print job object in response to print instructions given by the user. A print job transmitter 205 transmits the print job object generated by the print job generator onto a network via a communication interface 206. The communication interface 206 controls interface operations between the printer and the network. Further, a print job receiver 207 receives the print job object from the network via the communication interface 206.

A display 208 displays various graphical user interfaces (GUI) for the user.

FIG. 3 is one example of a set screen of a print job displayed on the display 208. A print job attribute of the print job object is displayed on this set screen. Further, the user can set the print job attribute of the print job object on this set screen.

The job name of the print job "Job 1" is displayed and set in the job name display 300. The name of the printer "Printer 1" and the URL address of the printer are displayed and set in the printer name display 301. The document name that the user produces with an application program and wishes to print "Document A" is displayed and set in the document name display 302.

The priority of a print job is displayed and set in the priority display 303. In FIG. 3, "Average" is set as the priority of the print job. The number of pages to be printed is displayed and set in the pages-to-print display 304. In FIG. 3, "All" pages are set to be printed. The number of copies to be printed is displayed and set in the copies display 305. In FIG. 3, "1" is designated.

The conditions of use for a substitute printer are designated in the substitute printer display 306. In the set screen of the present embodiment "Used if set printer fails in printing" and "Used if set printer is inadequate for set print job" can be designated. In FIG. 3, both are designated.

Figure 4:
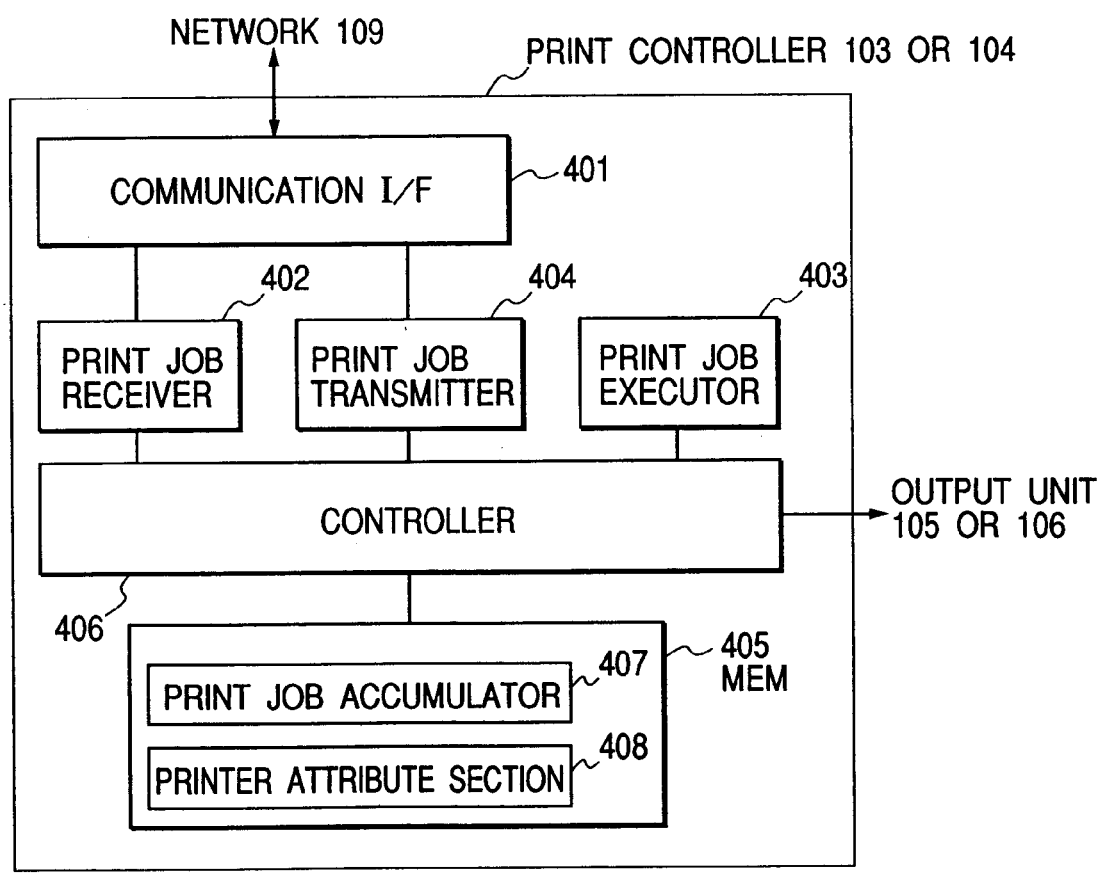
FIG. 4 is a functional block diagram of a printer.

Next the printer is explained. FIG. 4 is a block diagram showing the functional composition of the printer 107 and the printer 108. The functional composition of the printers is explained referring to FIG. 1.

Printer controllers 103 and 104 comprise a communication I/F 401 that controls the interface operations between a network 109 and an apparatus, a print job receiver 402 that receives a print job object 110 from host computers 101 and 102, a print job executor 403 that analyzes the print job object received by the print job receiver 402 and processes the print job, a print job transmitter 404 that informs host computers 101 and 102 of the results of the print job processing or transmits the print job object 110 to a substitute printer, a memory 405 which stores an operating system (OS), various control programs, and control data, and a controller 406 that connects each element of the construction and controls the device as a whole.

Controller 406 sends an output command to output units 105 and 106. Memory 405 is equipped with a print job accumulator 407 that stores the print job object and a printer attribute section 408 that stores attributes of the printer (such as paper size of the cassette, capability for black and white or color printing, resolution, etc.).

Figure 5:
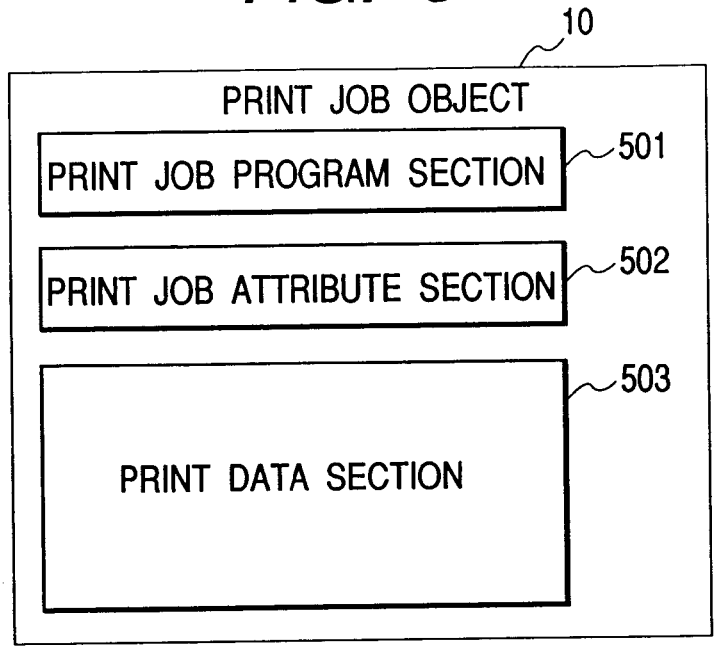
FIG. 5 is a format diagram showing a configuration of a print job object.

Next the print job object is explained. FIG. 5 is a format diagram showing the construction of the print job object 10 produced by the print job generator 204 of the host computer. The print job object 10 comprises a print job program section 501 that stores a print job processing program executed by the print job executor 403, a print job attribute section 502 that stores the print job attributes displayed on the set screen shown in FIG. 2 or set on the set screens and other print job attributes (origin of print job issue, type of print job request, paper size, black and white or color print), and a print data section 503 that stores print data output by the output units 105 and 106 based on the attributes.

The print job executor 403 processes the print data stored in the print data section 503 based on the print processing program stored in the print job program section 501. At that time the print job executor 403 processes the print data referring to the print job attributes stored in the print job attribute section 502.

Print job attributes such as "job name", "origin of request", "request address", "request content", "text name", "paper size", "color/black and white", "priority", "print pages", "print copies", "print finished page", "print finished copy", and "result" are stored in the print job attribute section 502.

Figure 6:
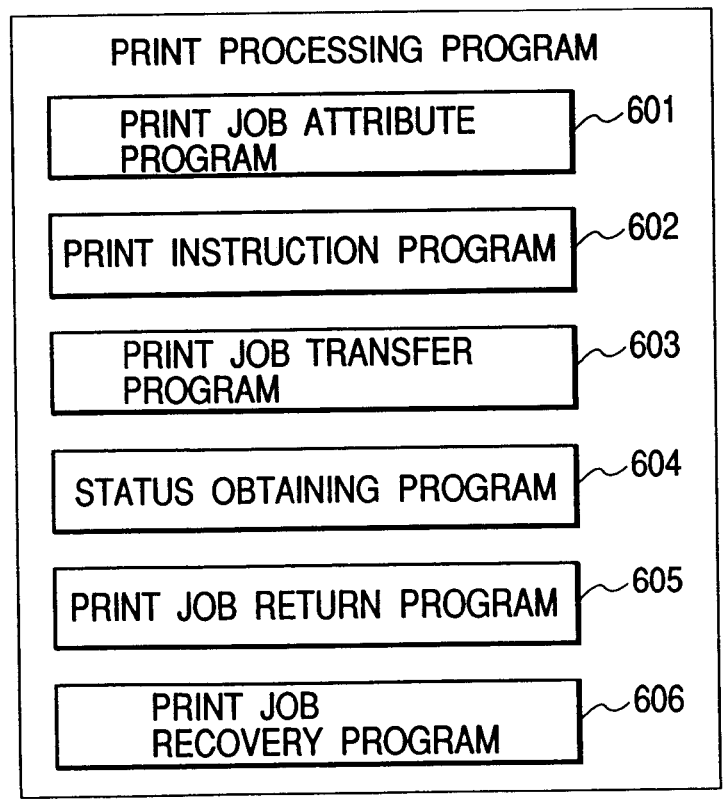
FIG. 6 is a format diagram showing a configuration of a print job processing program.

Next the print processing programs stored in the print job program section are described. FIG. 6 is a diagram showing the construction of the print processing program. The print processing program comprises a print job attribute program 601 for determining whether the printer is adequate for the print job attributes, a print instruction program 602 for instructing the print output if the printer is adequate for the print job attributes, a print job transfer program 603 for finding a substitute printer on the network 109 if the printer is not adequate for the print job attributes and transferring the print job object to the detected substitute printer, a status obtaining program 604 for obtaining the printer status, a print job return program 605 for returning the print job object and informing the host computer of the results of the print job processing, and a print job recovery program 606 for transferring the print job to a substitute printer if the print job processing fails and continuing print job processing on that substitute printer.

The procedure for finding printers attached to the network 109, or, if multiple printers are found, the procedure for deciding on a substitute printer from among these is registered in the print job transfer program 603. If a particular printer has already been selected as the substitute printer, this is registered in the program. Further, the procedure for transferring the print job object to the substitute printer is registered in the program.

A print job processing program is selected from among several print job processing programs depending on the conditions for use of a substitute printer indicated by the user on the set screen shown in FIG. 2 and stored in the print job program section 501.

For example, if "Used if set printer fails in printing" is not indicated, a print job program without the print job recovery program 606 is selected. If "Used if set printer is inadequate for set print job" is not indicated, a print job processing program without the print job attribute program 601 is selected.

The print job processing program is written in a programming language that can be interpreted by the print job executor 403 of the printer. For example, if the print job executor 403 is mounted on a JAVA interpreter the print job processing program is written in JAVA.

Figure 10:
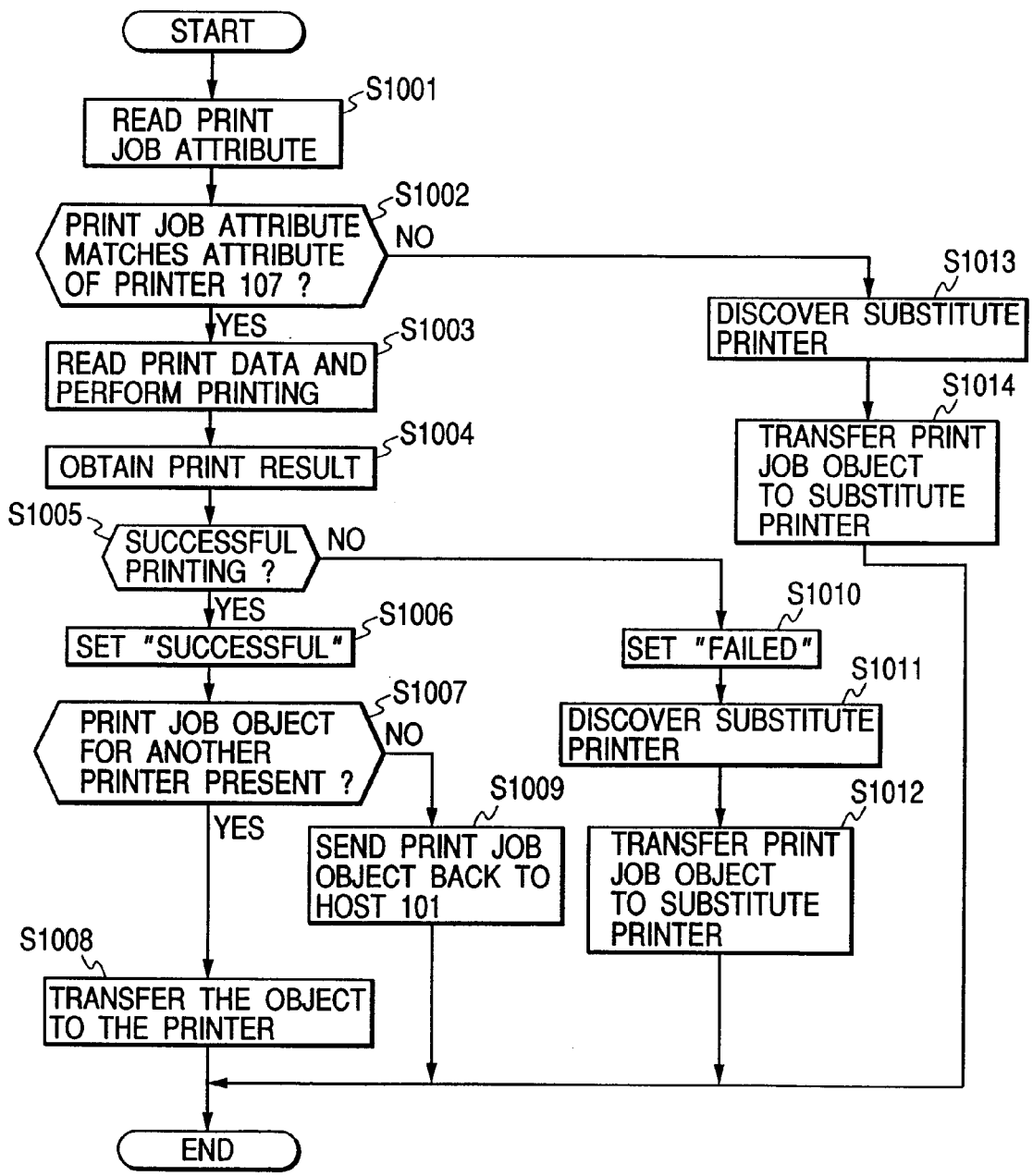
FIG. 10 is a flowchart showing a print job processing program according to a first example.
Figure 11:
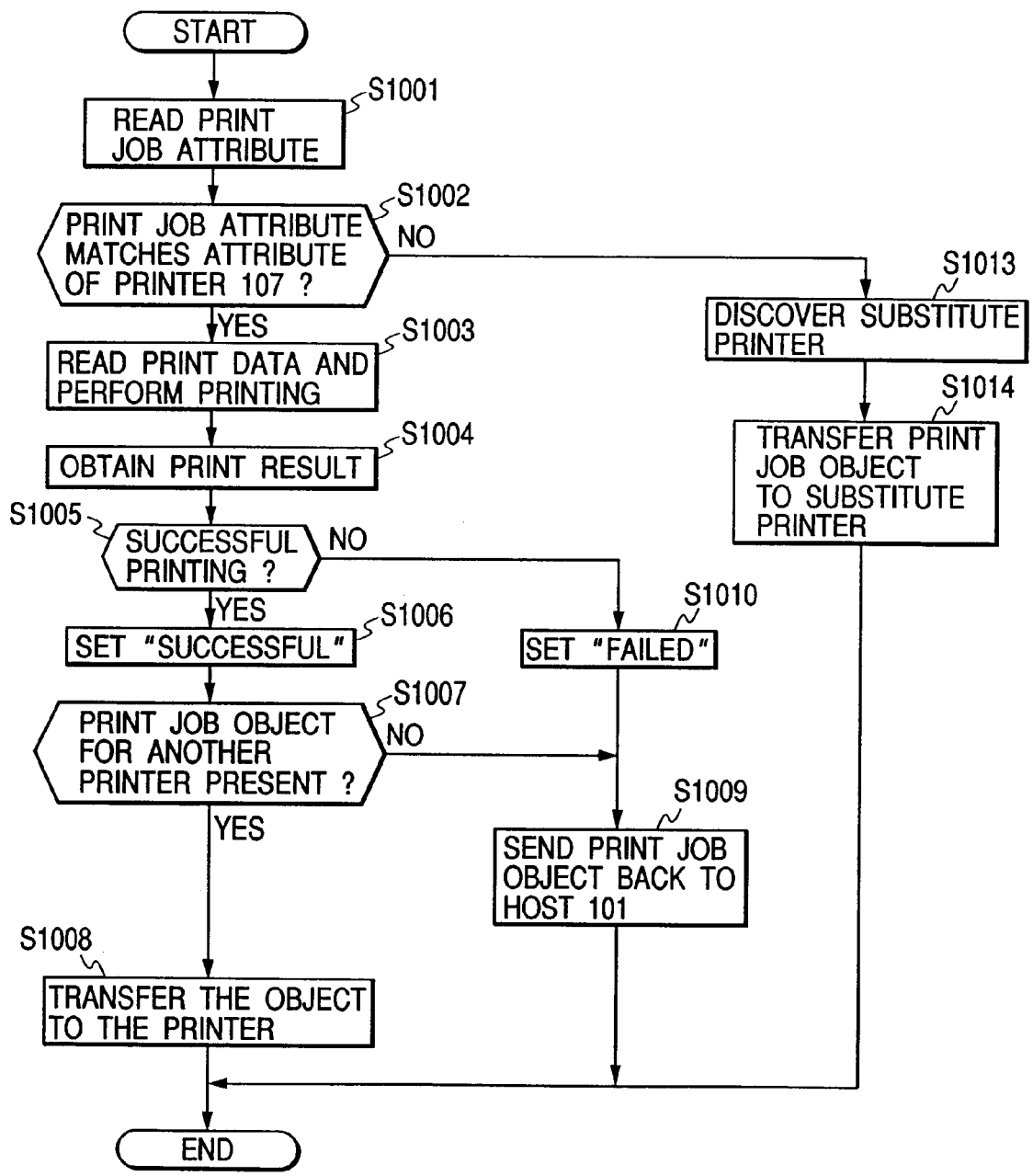
FIG. 11 is a flowchart showing a print job processing program according to a second example.
Figure 12:
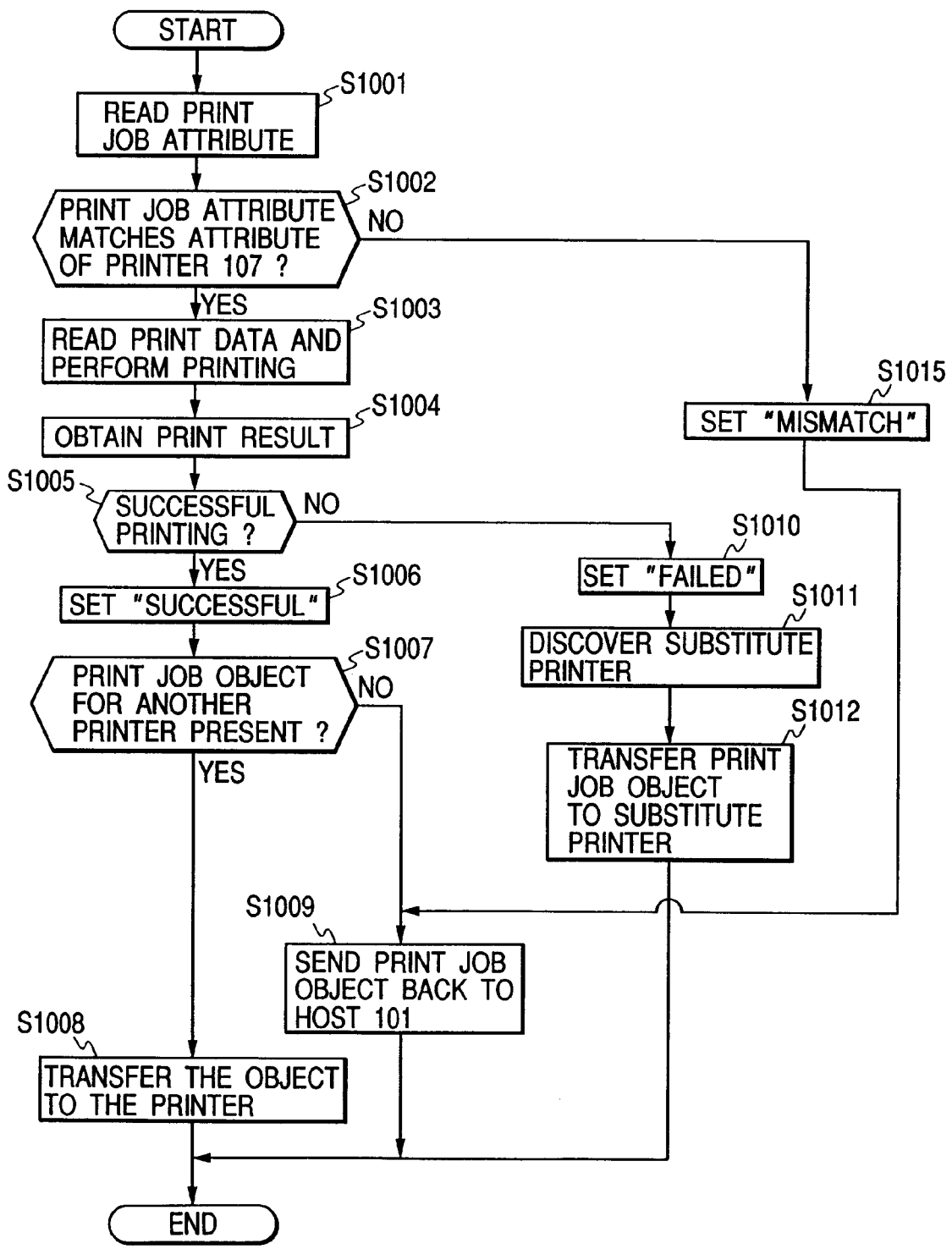
FIG. 12 is a flowchart showing a print job processing program according to a third example.

The flow charts shown in FIGS. 10, 11, and 12 are given as examples of print job processing programs, but the present invention is not limited to these. The print job processing program can also be any type of program which can be executed by the print job executor 403 or it can be prepared for each user, host computer, or application program separately.

Figure 7:
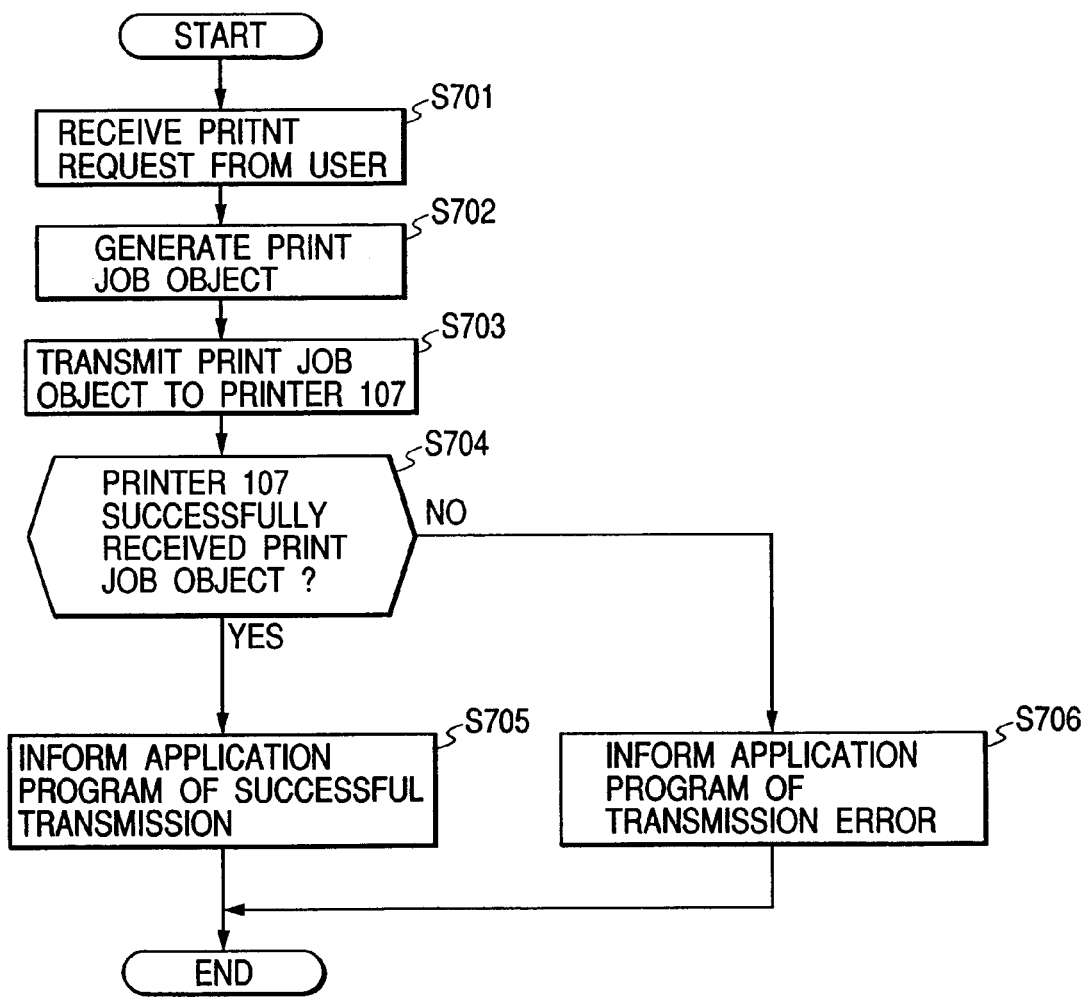
FIG. 7 is a flowchart diagram in which a host computer transfers a printed object to a printer.

Next all steps from transmitting the print job object from the host computer to the printer are described. FIG. 7 is a flow chart showing the transmission of the print job object 10 to the printer by the host computer. According to this flow chart, the program is executed by the controller 202 of the host computer 101.

In step S701, application 203 receives a print request from the user. After this, the print job object 110 is generated by the print job generator 204 in step S702. Next, in step S703, the generated print job object 110 is sent to the printer 107 by the print job transmitter 205.

Then in step S704, it judges whether or not the printer 107 successfully received the print job object 110. If the printer 107 successfully received the print job object (S704-Yes), in step S705 it informs the application program 203 that the print job was successfully transmitted to the printer 107. If the print job was not successfully transmitted to the printer (S704-No), in step S706 it informs the application program 203 that a print job transmission error occurred.

Figure 8:
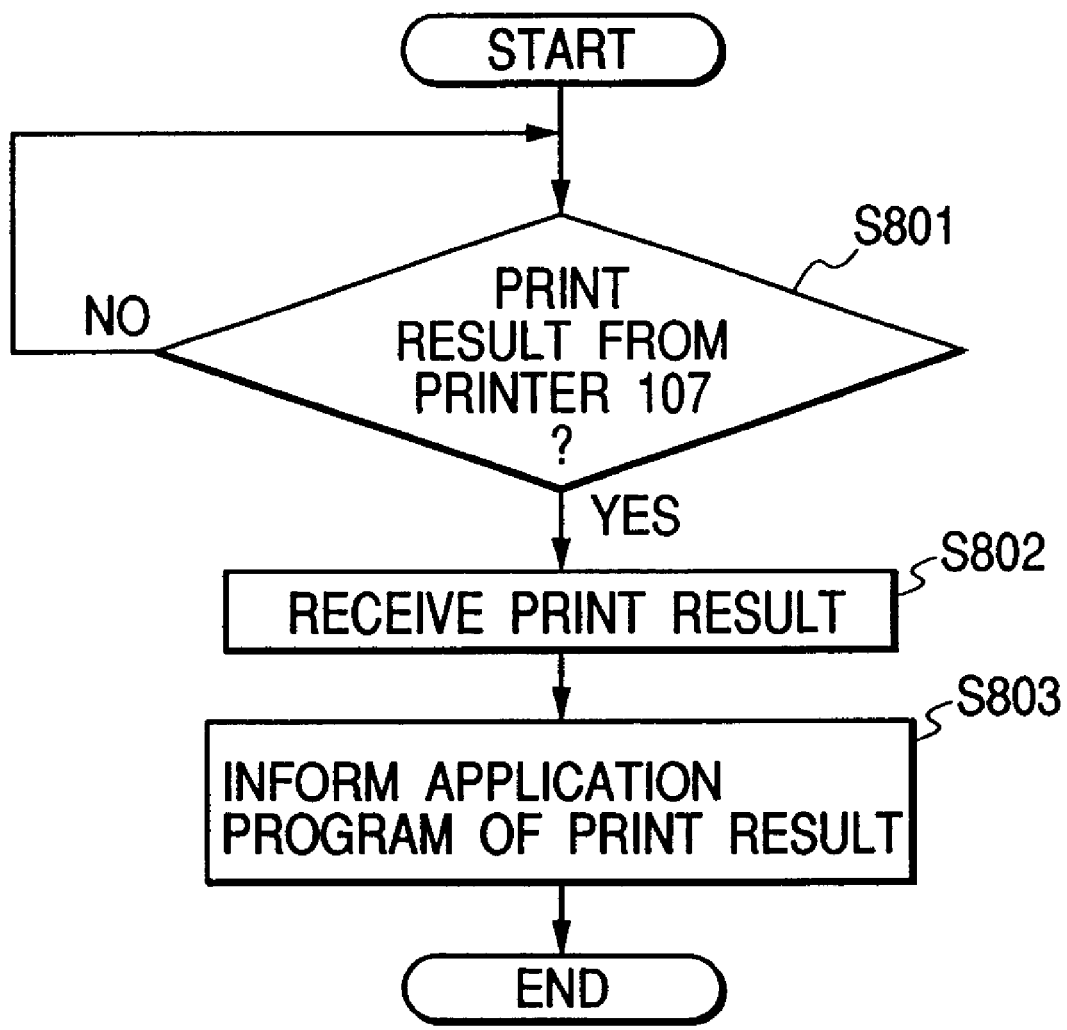
FIG. 8 is a flowchart in which the host computer receives results of a print processing.

Next, the procedures of receiving the result of print processing after the print job object is transmitted to the printer are described. FIG. 8 is a flow chart showing the host computer receiving the print processing result. The program according to this program is executed by the controller 202 of the host computer 101.

First, in step S801 it awaits being informed of the print result from the printer 107. If it is informed of the print result (S801-Yes), in step S802 it receives this result. Then in step S803 it informs the application program 203 of that result. The application program 203 displays to the user the print result if necessary.

Figure 9:
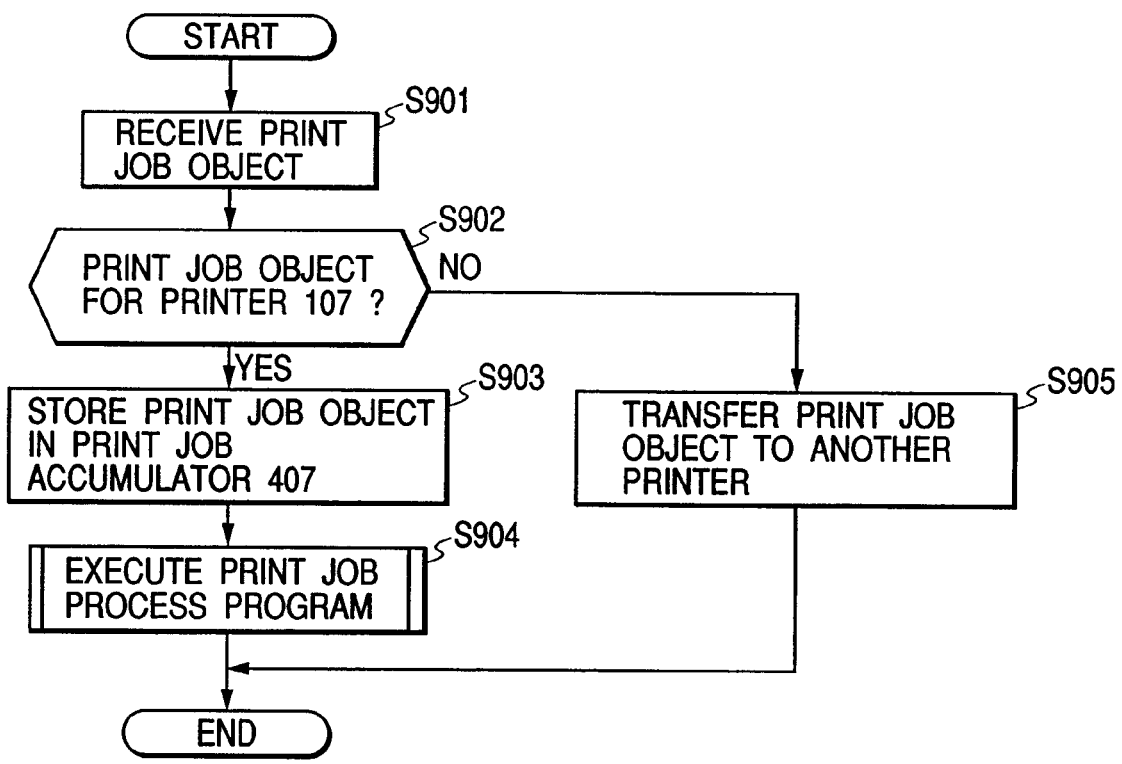
FIG. 9 is a flowchart showing operations when the printer receives the print job object.

Next, the procedures of processing the print job object in the printer are explained. FIG. 9 is a flow chart showing the operations of the printer 107 when it has received the print job object 110. The program according to this flow chart is executed by the controller 406 of the print control apparatus 103.

After the printer receives the print job object 110 in step S901, it confirms whether or not this print job was sent for the printer 107. If the print job object 110 was not sent for the printer 107 (S902-No), the print job object is transferred to another printer by the print job transmitter 404 in step S905.

If the print job object 110 was sent for the printer 107 (S902-Yes), it is stored in the print job accumulator 407 in step S903. Then in step S904 the print job executor 403 operates and executes the print job object.

Further, an example of the print job process program executed by the print job executor 403 in step S904 of FIG. 9 is explained. FIGS. 10 to 12 are examples of flow charts of print job processing programs. Print job executor 403 executes these print job processing programs and performs the print process. In other words, these flow charts show the operations of the printer.

FIG. 10 is a flow chart of a print job processing program when "Used if set printer fails in printing" and "Used if set printer is inadequate for set print job" are indicated for substitute printer in the set screen of FIG. 3.

FIG. 11 is a flow chart of a print job processing program when only "Used if set printer is inadequate for set print job" is indicated and "Used if set printer fails in printing" is not indicated for substitute printer.

FIG. 12 is a flow chart of a print job processing program when only "Used if set printer fails in printing" is indicated and "Used if set printer is inadequate for set print job" is not indicated for substitute printer.

First, the flow chart of FIG. 10 is explained. In step S1001, the print job attributes of the print job object stored in the print job attribute section 502 are read from the print job accumulator 407. Then in step S1002 it determines whether or not the print job attributes match the attributes of the printer according to the print job attribute program 601. The printer attributes are stored in the printer attribute section 408.

If the attributes do not match (step S1002-No), first it surveys the printers connected to the network 109 in step S1013 according to the job transmission program (discovery), and then the print job transmitter 404 transmits the print job object to the discovered substitute printer in step S1014. The arrow B in FIG. 1 shows the print job object 110 being transmitted from the printer 107 to the substitute printer 108.

During discovery of printers, a network broadcast message is transmitted in a dedicated socket provided in advance between printers. Thus a printer which sends a response to that message is detected.

If the attributes match (step S1002-Yes), in step S1003 the print data stored in the print job data section 503 of the print job object is read from the print job accumulator 407, and an image is printed based on that print data to output port 5 in step S1004. Also, the status of the printer is sensed by the status acquisition program. Thus, in step S1005 it is decided whether or not the print was successful.

If it is determined that the print failed (step S1005-No), "Failed" is written in the "Result" of the print job attribute section 502 of the print job object in step S1010. Then, in step S1011, a substitute printer is discovered by the job transfer program and in step S1012, the print job object is transferred to the substitute printer by the print job transmitter 404.

If it is determined that the print was successful (step S1005-Yes), in step S1006 "Successful" is written in the "Result" of the print job attribute section 502 of the print job object. Then, in step S1007 it checks whether or not there is a print job object to be processed by another printer among the print job objects.

If there is a print job object to be processed by another printer (step S1007-Yes), in step S1008 the print job object is transmitted to the another printer by the print job transmitter 404. However, if there is no print job object to be processed by another printer (step S1007-No), the print job object is returned to the host computer 101 by the print job transmitter 404 in step S1009.

Next, FIG. 11 is explained. The same step numbers have been applied to steps, which are the same in the flow charts of FIG. 11 and FIG. 10. In FIG. 11, only "Used if set printer is inadequate for set print job" is indicated for the substitute printer in the set screen of FIG. 3, and "Used if set printer fails in printing" is not indicated. As a result, if the print fails (step S1005-No), after "Failed" is written in the "Result" of the print job attribute section 502 of the print job object in step S1010, the print job object is returned to the host computer 101 in step S1009. In other words, the print job processing program of FIG. 11 does not print on a substitute printer even if the print fails.

Next, FIG. 12 is explained. The same step numbers have been applied to steps, which are the same in the flow charts of FIG. 12 and FIG. 10. In FIG. 12, only "Used if set printer fails in printing" is indicated for the substitute printer in the set screen of FIG. 3, and "Used if set printer is inadequate for set print job" is not indicated. As a result, if it is determined that the print job attributes do not match the printer attributes (step S1002-No), after "Mismatch" is written in "Result" of the print job attribute section 502 of the print job object in step S1015, the print job object is returned to the host computer 101 in step S1009. In other words, even if the printer is inadequate for the print job, the print job processing program of FIG. 12 will not print on a substitute printer.

Examples of print job attribute are explained using FIG. 13. In FIG. 13, the contents of print job attributes are shown with print job attribute items lined up across and examples (1) through (5) listed from top to bottom.

First, the print job attribute of example (1) is for a case in which a print request for "Document A" was issued from "Host I" to "Printer I". For the print job object "Document A" the paper size is "A4", the priority is "Average", the number of copies is "1", and the pages to be printed are "1–20". If the print is successful on "Printer I" the print job attribute of example (1) becomes the print job attribute of example (2). For the print job attribute of example (2), the number of pages printed is "20", the number of copies printed is "1", and the result is "successful".

The print job attribute for example (3) is for a case in which a No Paper signal was emitted after pages 1–10 were printed on "Printer I". In "Job I", "10" is written in the number of pages printed, "0.5" is written in the number of copies printed, and "no paper, substitute printer" is written in the result. Then, "Job II" is generated, and in the print job attribute of "Job II", the printer is "Printer II", the pages to be printed is "11–20", and the result is "unexecuted". Then the print job object is transferred to "Printer II" and "Job II" is processed on "Printer II".

The print job attribute for example (4) is for a case in which the printer is mismatched to the print job as there is only A3 paper in the printer. "No size, substitute printer" is written in the result on "Job I". Then "Job II" is generated, and "Printer II". becomes the printer requested in the print job attribute of "Printer II". Then the print job object is transferred to "Printer II" and "Job II" is processed by "Printer II".

The print job attribute for example (5) is for a case in which a print request for "Document B" is issued to "Printer I" and "Printer II". Accordingly, "Job I" is processed by "Printer I" and "Job II" is processed by "Printer II".

As described above, in the present embodiment, the print job object is processed by a printer that matches the print job attribute of the print job object. As a result, the user can print the print job produced by an application program on a suitable printer.

Further, in the present embodiment, even if the print job process fails during the print, the print job object is transferred to a substitute printer and is continuously processed. As a result, the user does not need to reprint from the beginning, which saves the user some trouble.

Also, in the present embodiment, the print job processing program is generated by the host computer. As a result, printing can be performed by methods that vary according to each host computer, user, and application program and in response to various print jobs.

Figure 14:
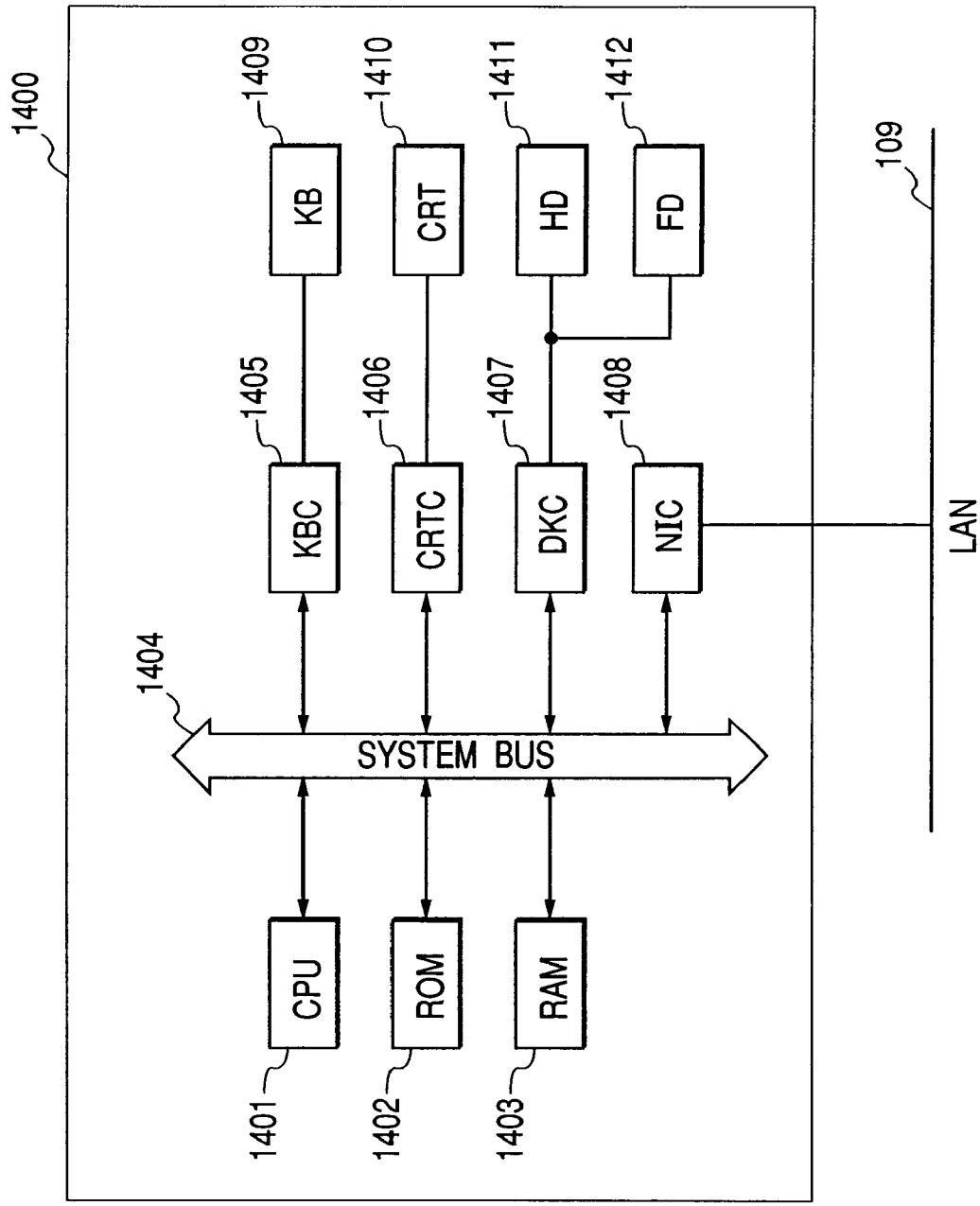
FIG. 14 is a block diagram showing a control configuration of a host computer.

Next, a concrete example of a host computer in the present embodiment is explained. FIG. 14 is a block diagram showing the control structure of the host computer. The functional composition of FIG. 1 is installed on the control structure of FIG. 14. In FIG. 14, 1400 is the main body of the host computer. The main body 1400 comprises a CPU 1401 which executes programs stored on a ROM 1402 or a hard disk (HD) 1411 or supplied from a floppy disk drive (FD) 1412 and controls inclusively each device connected to a system bus 1404.

1403 is RAM that functions as the main memory of the CPU 1401, a work area, or the like. 1405 is a keyboard controller (KBC) that controls input from keyboard (KB) 1409, a pointing device not shown in the Figure, or the like. 1406 is a CRT controller (CRTC) that controls the display of a CRT display (CRT) 1410. 1407 is a disk controller (DKC) that controls a hard disk (HD) 1411 and a floppy disk drive (FD) 1412 that store such things as a boot program, various application programs, edit files, user files, or network management software. 1408 is a network interface card (NIC) that performs transfer of data in both directions with the printer through a LAN 109.

Figure 15:
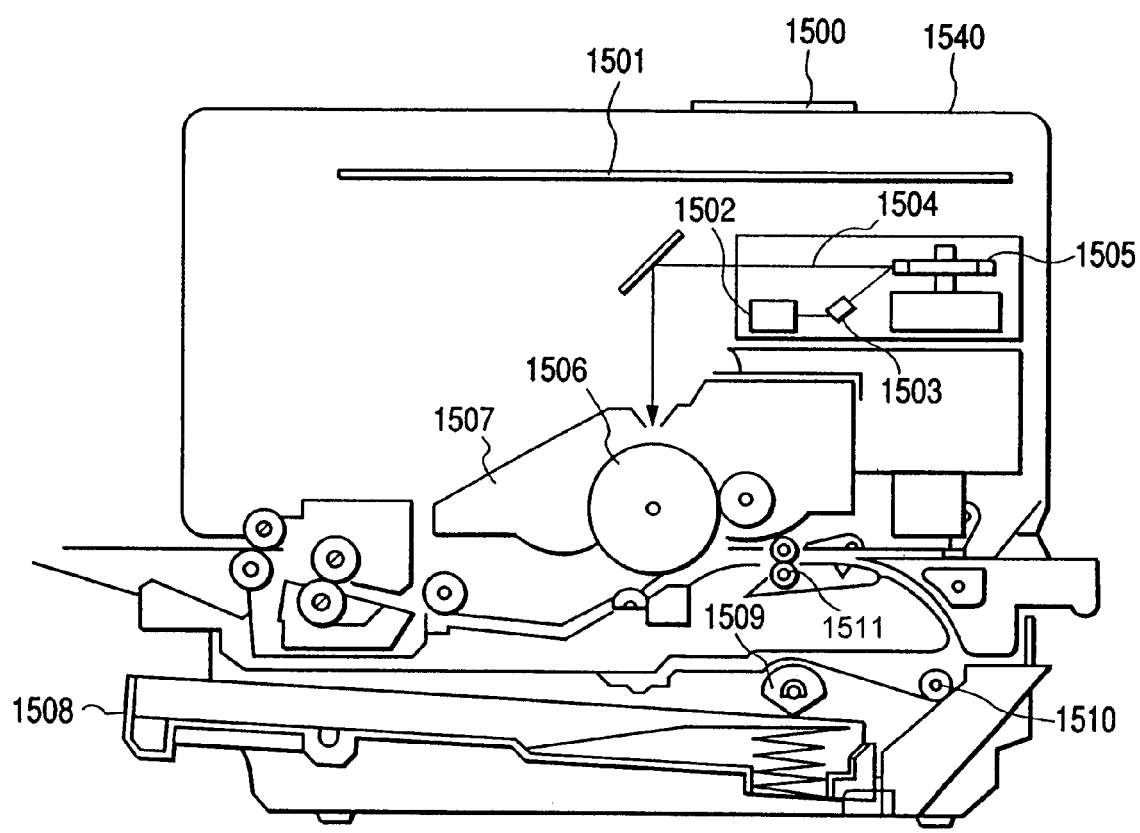
FIG. 15 is a diagram showing an internal configuration of a printer.

Next, a concrete example of a printer in the present embodiment is described. FIG. 15 is a cross-section showing the inner structure of a laser beam printer (LBP). This LBP can print on recording paper by inputting character pattern data.

In FIG. 15, 1540 is the main body of an LBP that forms images on recording paper, which is a recording medium, based on the character patterns provided. 1500 is an operation panel provided with such things as a switch and an LED display for operation. 1501 is a control unit for the entire LBP 1540 and a printer control unit that analyzes such things as character pattern information. This printer control unit 1501 mainly outputs character pattern information to a laser driver 1502 converting it to a video signal.

The laser driver 1502 is a route for driving a semiconductor laser 1503 and switches the laser beam 1504 radiated from the semiconductor laser 1503 on or off in response to the video signal input. The laser beam 1504 scans the electrostatic drum 1506, swung left and right by a rotating polyhedron mirror 1505. In this way an electrostatic latent image of the character pattern is formed on the electrostatic drum 1506. This latent image is transferred to the recording paper after it has been developed by a developing unit 1507 on the periphery of the electrostatic drum.

A cut sheet is used for this recording paper. The cut sheet recording paper is housed in a multiple sheet cassette 1508 corresponding to multiple types of sheets attached to the LBP 1540 and is supplied to the electrostatic drum 1506 pulled into the apparatus between a sheet feed roller 1509 and conveying rollers 1510 and 1511.

Figure 16:
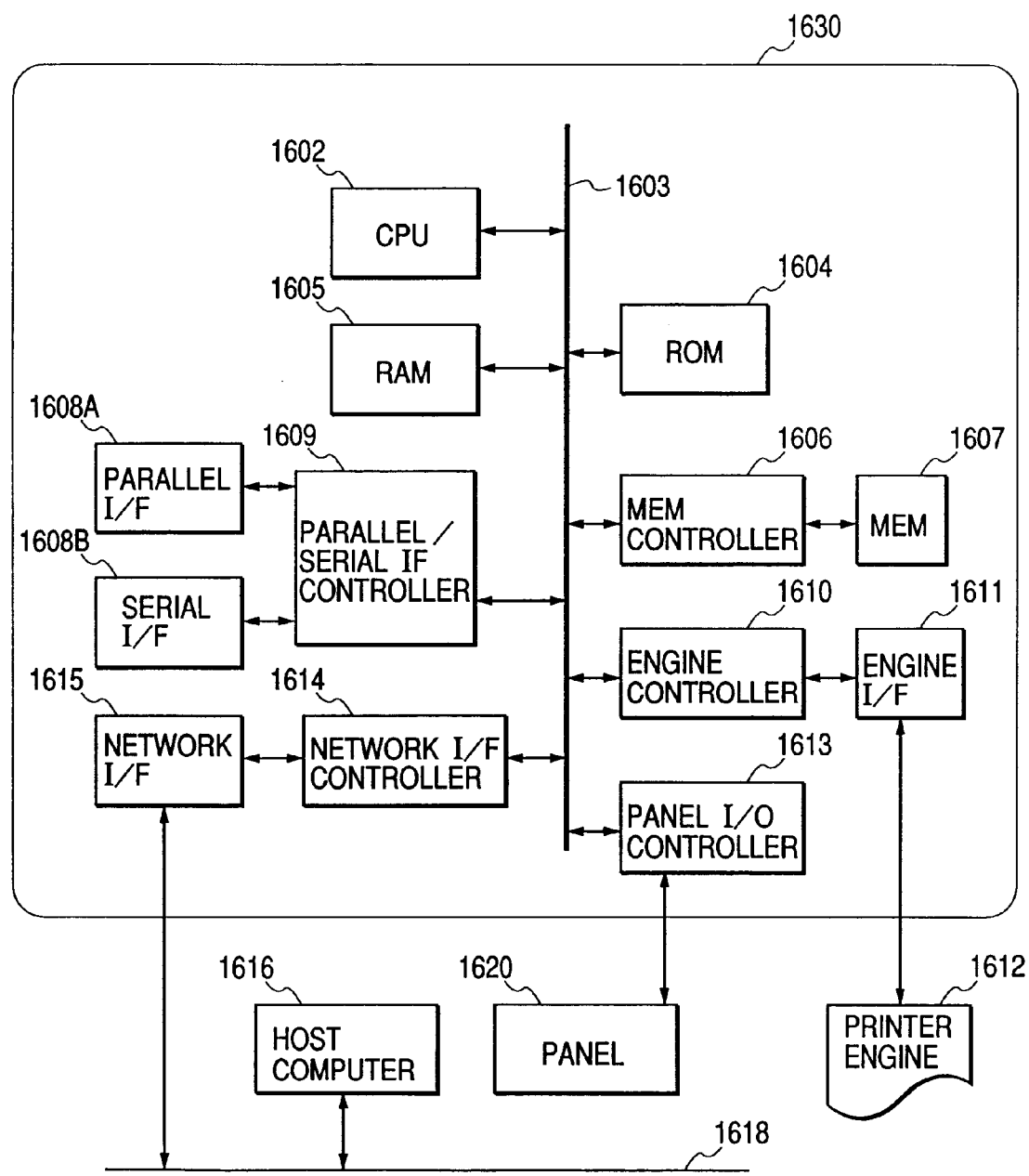
FIG. 16 is a block diagram showing a control configuration of the printer.

Next, the control structure for executing record control of the above laser beam printer is explained referring to the block diagram shown in FIG. 16. The functional composition of FIG. 1 is mounted on the control structure of FIG. 16. In FIG. 16, 1630 is a printer control unit. It is constructed such that it can communicate with a host computer 1616 connected to a network 1618 through a network interface 1614 that controls the network interface 1615.

1602 is a CPU that controls each device connected to a bus 1603 based on a control program stored in a ROM 1604. The present invention is realized when the CPU 1602 executes the program relating to the present invention (such as the flow charts explained in the first and second embodiments). 1605 is RAM that temporarily stores such things as data used by the CPU 1602 or print data.

1610 is an engine controller that controls a printer engine 1612 through an engine interface (I/F) 1611 and performs printing.

1606 is a memory controller that controls a memory 1607. 1609 is a parallel/serial I/F controller that controls a parallel I/F 1608A and a serial I/F 1608B. 1613 is a panel I/O controller that controls a panel 1620.

1618 is a network that connects a host computer 1616 to the printer control unit 1630.

Figure 17:
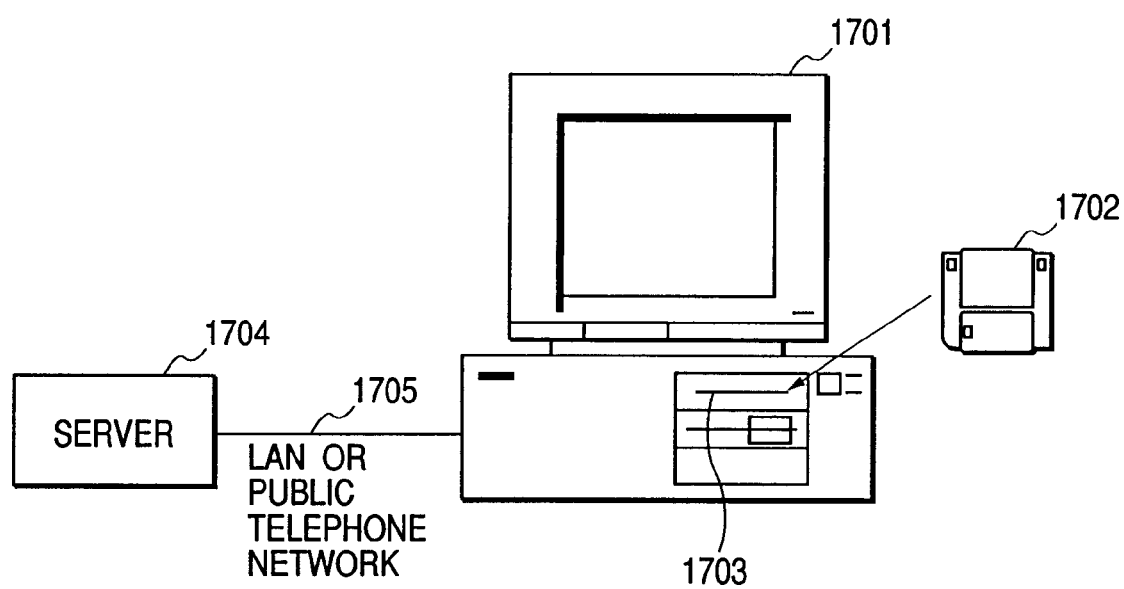
FIG. 17 is a diagram showing a method for supplying a program according to the present invention to a system and a device.

Also, as shown in FIG. 17, the object of the present invention is to provide a recording medium that stores a program code of a software that realizes the functions of the present embodiment to a system or apparatus shown in FIGS. 14 and 16. It goes without saying that this can also be achieved when the computer (or CPU or MPU) of this system or apparatus reads and executes the program code stored on the recording medium.

As shown in FIG. 17, the recording medium 1702 is inserted into a disk drive 1703 of a computer 1701, which is connected to a server 1704 via a network 1705, such as a LAN or a public telephone network.

In this case, the program code read from the recording medium itself realizes the functions of the before-mentioned embodiment, and the recording medium that stored that program code and the server apparatus that sent the program code comprise the present invention.

In the present embodiment, an example is shown in which the program and related data are executed from the recording medium loaded directly on RAM, but alternatively, the program and related data can be temporarily installed from an external recording medium such as an FD onto a hard disk that is a non-volatile recording medium inside the external memory, and loaded on RAM from the hard disk when the data production/transfer processing control program is operated. Such things as a floppy disk, a hard disk, an optical disk, a photomagnetic disk, a CD-ROM, a CD-R, a magnetic tape, a non-volatile memory card, or a ROM can be used as recording media for supplying the program code. Also, by executing the program code that the computer reads, not only are the functions of the present embodiment realized, but the OS (operating system) operating on the computer performs all or part of the actual process based on instructions from that program code and it goes without saying that through that process the above mentioned functions of the present embodiment are realized.

Further, after the program code read from the recording medium is written on the memory that the function expansion unit is provided with connected to the computer or to a function expansion board inserted into the computer, the CPU that that function expansion board or function expansion unit is provided with performs all or one part of the actual processes based on instruction of the program code, and it goes without saying that through that process the functions of the above-mentioned embodiment are realized.

What is claimed is:

1. A print control apparatus comprising:
a reception unit, which receives a print job that includes print data and a plurality of procedures associated with the print data and job attribute information from a network, wherein the plurality of procedures include a determination procedure for determining, based on the job attribute information, whether the print job can be processed by said print control apparatus and a search procedure for searching for a second print control apparatus that can process the print job, if the determination procedure determines that the print job cannot be processed by said print control apparatus;
a memory unit, which stores the print data received by said reception unit; and
a print control unit, which controls a printing device to output an image based on the print data received by said reception unit, in accordance with execution results of the plurality of procedures.

2. An apparatus according to claim 1, further comprising:
a transfer unit, which transfers the print job to an external device, wherein said print control unit controls said transfer unit according to the plurality of procedures;
a discrimination unit, which discriminates a procedure for controlling said print control unit, among the plurality of procedures received by said reception unit; and
an executing unit, which executes the procedure discriminated by said discrimination unit.

3. An apparatus according to claim 1, further comprising:
a management unit, which manages job information that corresponds to the print data; and
a determination unit, which determines whether the printing device has completed output of the image,
wherein said management unit modifies the job information in accordance with a determination by said determination unit,
wherein said determination unit is controlled in accordance with the plurality of procedures received by said reception unit, and
wherein said management unit and said determination unit function in accordance with respective ones of the plurality of procedures.

4. An apparatus according to claim 2, further comprising a discovery unit, which discovers the external device, wherein said print control unit controls said discovery unit according to the plurality of procedures, wherein said transfer unit transfers the print job to the external device discovered by said discovery unit, and wherein said discovery unit functions in accordance with one of the plurality of procedures.

5. An apparatus according to claim 1, wherein the plurality of procedures and the print data are included in a first print object, and the first print object further includes a second print object.

6. An apparatus according to claim 2, wherein a print attribute is included in the print job and said print control unit controls the printing device according to the print attribute, wherein said apparatus further comprises a decision unit, which decides whether said print control unit controls the printing device according to the print attribute, and wherein said print control unit sends the print job to said transfer unit in accordance with a decision by said decision unit.

7. An apparatus according to claim 2, further comprising a detection unit, which detects a status of the printing device, wherein said print control unit sends the print job to said transfer unit if said detection unit detects that the printing device is not able to print.

8. An apparatus according to claim 6, further comprising a change unit, which changes the print attribute applied to the print data by executing the plurality of procedures received by said reception unit.

9. A print control apparatus according to claim 1, wherein the determination procedure is processed by referring to the job attribute information included in the received print job and to an attribute of the printing device, and wherein said print control apparatus further comprises a transfer unit, which is adapted to transfer the received print job to the second print control apparatus searched in the search procedure.

10. An information processing apparatus which can communicate with a print control apparatus, said information processing apparatus comprising:

a generation unit, which generates a print job that includes print data and a plurality of procedures associated with the print data and job attribute information, wherein the plurality of procedures include a determination procedure for determining, based on the job attribute information, whether the print job can be processed by said print control apparatus and a search procedure for searching for a second print control apparatus that can process the print job, if the determination procedure determines that the print job cannot be processed by said print control apparatus; and a transmission unit, which transmits the print job generated by said generation unit to said print control apparatus or to the second print control apparatus.

11. An apparatus according to claim 10, further comprising a selection unit, which selects a type of one of the plurality of procedures.

12. An apparatus according to claim 10, wherein a print attribute is included in the print job.

13. An information processing apparatus according to claim 10, wherein the determination procedure is processed by referring to the job attribute information included in the generated print job and to an attribute of a printing device.

14. A print system comprising an information processing apparatus and a print control apparatus, wherein said information processing apparatus comprises:

a generation unit, which generates a print job that includes print data and a plurality of procedures associated with the print data and job attribute information, wherein the plurality of procedures include a determination procedure for determining, based on the job attribute information, whether the print job can be processed by said print control apparatus and a search procedure for searching for a second print control apparatus that can process the print job, if the determination procedure determines that the print job cannot be processed by said print control apparatus; and a transmission unit, which transmits the print job generated by said generation unit to said print control apparatus or to the second print control apparatus, and wherein said print control apparatus comprises:

a reception unit, which receives the print job from said information processing apparatus;

a memory unit, which stores the print data received by said reception unit; and a print control unit, which controls a printing device to output an image based on the print data received by said reception unit, in accordance with execution results of the plurality of procedures.

15. A print system according to claim 14, wherein the determination procedure is processed by referring to the job attribute information included in the generated print job and to an attribute of the printing device.

16. A print control method comprising:

a reception step, of receiving a print job that includes print data and a plurality of procedures associated with the print data and job attribute information from a network, wherein the plurality of procedures include a determination procedure for determining, based on the job attribute information, whether the print job can be processed by the print control apparatus and a search procedure for searching for a second print control apparatus that can process the print job, if the determination procedure determines that the print job cannot be processed by the first print control apparatus;

a storage step, of storing in a memory the print data received in said reception step; and a print control step, of controlling a printing device to output an image based on the print data received in said reception step, in accordance with execution results of the plurality of procedures.

17. A method according to claim 16, further comprising:

a transfer step, of transferring the print job to an external device, wherein said print control step includes controlling execution of said transfer step according to the plurality of procedures;

a discrimination step, of discriminating a procedure for controlling execution of said print control step, among the plurality of procedures received in said reception step; and an executing step, of executing the procedure discriminated in said discrimination step.

18. A method according to claim 16, further comprising:

a management step, of managing job information that corresponds to the print data; and a determination step, of determining whether the printing device has completed output of the image, wherein said management step includes modifying the job information in accordance with a determination in said determination step, wherein execution of said determination step is controlled in accordance with the plurality of procedures received in said reception step, and wherein said management step and said determination step are performed in accordance with respective ones of the plurality of procedures.

19. A method according to claim 17, further comprising a discovery step, of discovering an external device, wherein said print control step includes controlling execution of said discovery step according to the plurality of procedures, wherein said transfer step includes transferring the print job to the external device discovered in said discovery step, and wherein said discovery step is performed in accordance with one of the plurality of procedures.

20. A method according to claim 16, wherein one of the plurality of procedures and the print data are included in a first print object, and the first print object further includes a second print object.

21. A method according to claim 17, wherein a print attribute is included in the print job and said print control step includes controlling the printing device according to the print attribute, wherein said method further comprises a decision step, of deciding whether said print control step controls the printing device according to the print attribute, and wherein said print control step includes causing the print job to be sent in said transfer step, in accordance with a decision in said decision step.

22. A method according to claim 17, further comprising a detection step, of detecting a status of the printing device, wherein said print control step includes causing the print job to be sent in said transfer step if it is detected in said detection step that the printing device is not able to print.

23. A method according to claim 21, further comprising a change step, of changing the print attribute applied to the print data by executing the plurality of procedures received in said reception step.

24. A print control method according to claim 16, wherein the determination procedure is processed by referring to the job attribute information included in the received print job and to an attribute of the printing device, and wherein said method further comprises a transfer step, of transferring the received print job to the second print control apparatus searched in the search procedure.

25. An information processing method which can communicate with a first print control apparatus, said method comprising:

a generation step, of generating a print job that includes print data and a plurality of procedures associated with the print data and job attribute information, wherein the plurality of procedures include a determination procedure for determining, based on the job attribute information, whether the print job can be processed by the first print control apparatus and a search procedure for searching for a second print control apparatus that can process the print job, if the determination procedure determines that the print job cannot be processed by the first print control apparatus; and a transmission step, of transmitting the print job generated in said generation step to the first print control apparatus or to the second print control apparatus.

26. A method according to claim 25, further comprising a selection step, of selecting a type of one of the plurality of procedures.

27. A method according to claim 25, wherein a print attribute is included in the print job.

28. An information processing method according to claim 25, wherein the determination procedure is processed by referring to the job attribute information included in the generated print job and to an attribute of a printing device.

29. A printing method comprising an information processing method and a print control method, wherein said information processing method comprises:
a generation step, of generating a print job that includes print data and a plurality of procedures associated with the print data and job attribute information, wherein the plurality of procedures include a determination procedure for determining, based on the job attribute information, whether the print job can be processed by a first print control apparatus and a search procedure for searching for a second print control apparatus that can process the print job, if the determination procedure determines that the print job cannot be processed by the first print control apparatus; and a transmission step, of transmitting the print job generated in said generation step to the first print control apparatus or to the second print control apparatus; and wherein said print control method comprises:

a reception step, of receiving the print job transmitted in said transmission step;

a storage step, of storing in a memory the print data received in said reception step; and a print control step, of controlling a printing device to output an image based on the print data received in said reception step, in accordance with execution results of the plurality of procedures.

30. A method according to claim 29, wherein said print control method further comprises:

a transfer step, of transferring the print job to an external device, wherein said print control step includes controlling execution of said transfer step according to the plurality of procedures; and a discrimination step, of discriminating a procedure for controlling execution of said print control step, among the plurality of procedures received in said reception step; and an execution step, of executing the procedure discriminated in said discrimination step.

31. A method according to claim 30, wherein said print control method further comprises:

a management step, of managing job information that corresponds to the print data; and a determination step, of determining whether the printing device has completed output of the image, wherein said management step includes modifying the job information in accordance with a determination in said determination step, wherein execution of said determination step is controlled in accordance with the plurality of procedures received in said reception step, and wherein said management step and said determination step are performed in accordance with respective ones of the plurality of procedures.

32. A method according to claim 30, wherein said print control method further comprises a discovery step, of discovering the external device, wherein said print control step includes controlling execution of said discovery step according to the plurality of procedures, and wherein said transfer step includes transferring the print job to the external device discovered in said discovery step, wherein said discovery step is performed in accordance with one of the plurality of procedures.

33. A method according to claim 30, wherein one of the plurality of procedures and the print data are included in a first print object, and the first print object further includes a second print object.

34. A method according to claim 30, wherein a print attribute is included in the print job, and said print control step includes controlling the printing device according to the print attribute, wherein said print control method further comprises a decision step, of deciding whether execution of said print control step shall include controlling the printing device according to the print attribute, and wherein said print control step includes causing the print job to be sent in said transfer step, in accordance with a decision in said decision step.

35. A method according to claim 30, wherein said print control method further comprises a detection step, of detecting a status of the printing device, wherein said print control step includes causing the print job to be sent in said transfer step if it is detected in said detection step that the printing device is not able to print.

36. A method according to claim 34, wherein said print control method further comprises a change step, of changing the print attribute applied to the print data by executing the plurality of procedures received in said reception step.

37. A method according to claim 29, wherein said information processing method further comprises a selection step, of selecting a type of one of the plurality of procedures.

38. A method according to claim 29, wherein the determination procedure is processed by referring to the job attribute information included in the generated print job and to an attribute of the printing device.

39. A computer-readable memory medium storing a print control program for implementing a print control method, the method comprising:
- a reception step, of receiving a print job that includes print data and a plurality of procedures associated with the print data and job attribute information from a network, wherein the plurality of procedures include a determination procedure for determining, based on the job attribute information, whether the print job can be processed by a first print control apparatus and a search procedure for searching for a second print control apparatus that can process the print job, if the determination procedure determines that the print job cannot be processed by the first print control apparatus;
- a storage step, of storing in a memory the print data received in said reception step; and
- a print control step, of controlling a printing device to output an image based on the print data received in said reception step, in accordance with execution results of the plurality of procedures.

40. A memory medium according to claim 39, wherein the determination procedure is processed by referring to the job attribute information included in the received print job and to an attribute of the printing device, and wherein said method further comprises a transfer step, of transferring the received print job to the second print control apparatus searched in the search procedure.

41. A computer-readable memory medium storing an information processing program for implementing an information processing method, the method being able to communicate with a print control apparatus, said information processing method comprising:
- a generation step, of generating a print job that includes print data and a plurality of procedures associated with the print data and job attribute information, wherein the plurality of procedures include a determination procedure for determining, based on the job attribute information, whether the print job can be processed by a first print control apparatus and a search procedure for searching for a second print control apparatus that can process the print job, if the determination procedure determines that the print job cannot be processed by the first print control apparatus; and
- a transmission step, of transmitting the print job generated in said generation step to the first print control apparatus or to the second print control apparatus.

42. A memory medium according to claim 41, wherein the determination procedure is processed by referring to the job attribute information included in the generated print job and to an attribute of a printing device.

43. A computer-readable memory medium storing a print system program comprising an information processing program for implementing an information processing method and a print control program for implementing a print control method,
wherein the information processing method comprises:
- a generation step, of generating a print job that includes print data and a plurality of procedures associated with the print data and job attribute information, wherein the plurality of procedures include a determination procedure for determining, based on the job attribute information, whether the print job can be processed by a first print control apparatus and a search procedure for searching for a second print control apparatus that can process the print job, if the determination procedure determines that the print job cannot be processed by the first print control apparatus; and
- a transmission step, of transmitting the print job generated in said generation step to the first print control apparatus or to the second print control apparatus, and wherein said print control method comprises:
- a reception step, of receiving the print job transmitted in said transmission step;
- a storage step, of storing in a memory the print data received in said reception step; and
- a print control step, of controlling a printing device to output an image based on the print data received in said reception step, in accordance with execution results of the plurality of procedures.

44. A memory medium according to claim 43, wherein the determination procedure is processed by referring to the job attribute information included in the generated print job and to an attribute of the printing device.

* * * * *

UNITED STATES PATENT AND TRADEMARK OFFICE
CERTIFICATE OF CORRECTION

PATENT NO. : 6,809,831 B1
DATED : October 26, 2004
INVENTOR(S) : Makoto Minari

It is certified that error appears in the above-identified patent and that said Letters Patent is hereby corrected as shown below:

Title page,
Item [56], References Cited, U.S PATENT DOCUMENTS, insert -- 5,220,674 A 6/1993 Morgan et al. .... 709/223 --.

Drawings,
Sheet 6, Figure 7, "PRITNT" should read -- PRINT --.
Sheet 15, Figure 16, "SERIAL IF" should read -- SERIAL I/F --.

Column 7,
Line 57, "Printer II"." should read -- "Printer II" --.

Signed and Sealed this

Eighth Day of March, 2005

JON W. DUDAS
*Director of the United States Patent and Trademark Office*